June 30, 1931.　　　J. E. WALKER　　　1,812,388
FLUSH VALVE
Filed June 13, 1927
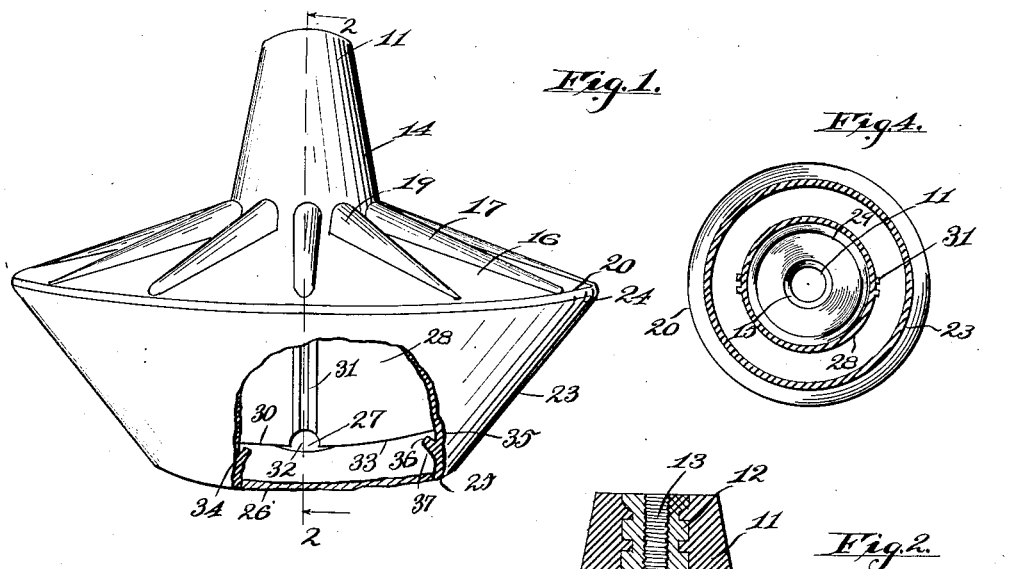
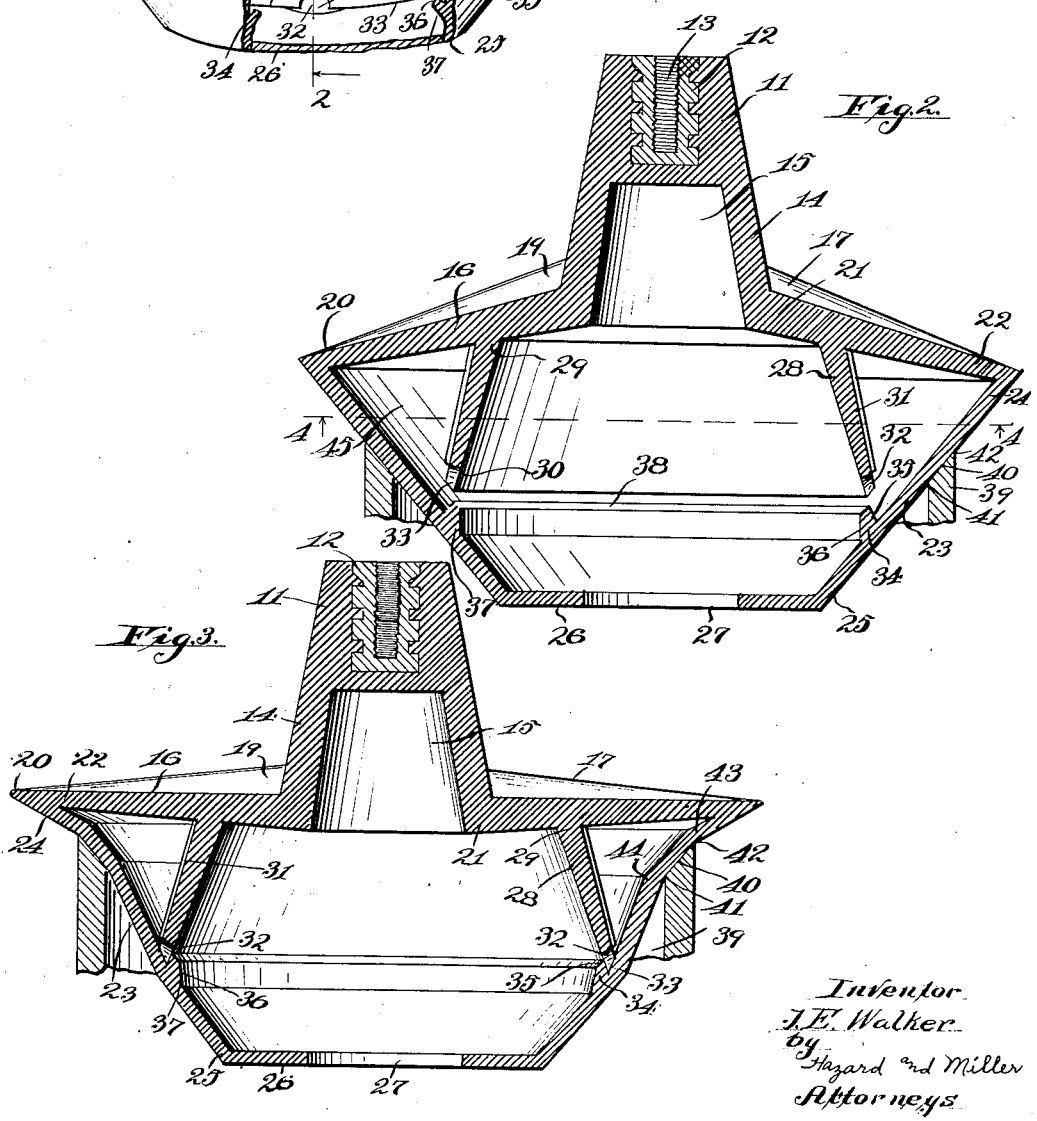
Inventor
J. E. Walker
by Hazard and Miller
Attorneys Patented June 30, 1931

1,812,388

UNITED STATES PATENT OFFICE

JACK E. WALKER, OF LOS ANGELES, CALIFORNIA, ASSIGNOR TO LONG-TURNEY CORPORATION, OF LOS ANGELES, CALIFORNIA, A CORPORATION OF CALIFORNIA

FLUSH VALVE

Application filed June 13, 1927. Serial No. 198,428.

My invention is a flushing valve for flushing tanks.

The purpose of a float valve is primarily to tightly seal the outlet of a tank so perfectly that it will not permit any fluid to escape through the tank outlet until it is desired to empty the tank, at which time the float is raised mechanically to a position where it will float until the tank is emptied.

Various shapes and forms of float valves have been devised, all of which form a seal by contacting with a certain portion of the valve seat, the latter being of cylindrical shape, terminating at its upper end in an inwardly beveled surface. Some float valves are designed to seal on the upper edge or periphery of the seat, others along the inwardly beveled surface, while some are designed to seal on the lower edge of the seat.

It has been my experience that in a new seat having a perfect surface and edges, nearly any type of float valve will seal perfectly, and prevent objectionable leaking, but after the seat has been in use many things may happen to change these conditions. Certain kinds of water may cause corrosion, thereby forming obstructions or pits on the surface or edges of the seat. Some waters may deposit incrustations of scale which would prohibit the proper seating of the float valve and cause leaking, in fact foreign matter of any kind getting between the valve seat and float valve would have this effect.

It is the purpose of my invention to overcome these difficulties and produce a float valve that will not only operate under ideal conditions but will shut off water under the adverse circumstances just mentioned.

My improved float valve, instead of sealing on one portion only of the valve seat, actually produces a triple seal. The side wall or seating portion of the float valve is caused to press outwardly against the valve seat, forming a contact over its entire surface. In addition to this action, a portion of the side wall is pushed beyond the upper periphery of the valve seat so that a tight seal is made over this edge. Similarly the side wall is stretched over the lower edge of the valve seat producing thereby another seal here.

The advantages of a triple seal are evident. If the upper edge of the valve seat is corroded or pitted, the float valve will then seal the surface portion or lower edge.

In constructing my valve I preferably form the body of a flexible material such as rubber, and have an upper somewhat conical-shaped wall which joins a downward conical-shaped wall, this downward wall having a rib with a central opening. Centrally positioned in the upper wall there is a projection or core which has a metal socket secured therein for attachment purposes to connect the flushing valve to the flushing mechanism, in the usual manner. The valve is made hollow and on the inside of the downwardly and inwardly sloping wall there is a ridge which, in the operation of the valve, is engaged by an annular partition which depends from the upper wall, this partition forming in effect a truss or a compression element, so that when the pressure of the water on top of the valve forces the upper surface downwardly, giving a species of toggle movement, it stretches the downward inverted coned wall over the edge of the valve seat, and the annular partition bends the wall below the seat thus giving a three-point contact, above mentioned, on the seat. In order to break any vacuum which may be formed, I have notches provided in the partition.

My invention in its various aspects is illustrated in the accompanying drawings, in which:

Figure 1 is a perspective view, partly broken away, of my valve.

Figure 2 is a vertical section through the valve when resting loosely on the valve seat.

Figure 3 is a section similar to Fig. 2, showing the valve in position forming the complete seal with liquid pressure on top of the valve.

Figure 4 is a cross-section on the line 4—4 of Fig. 3 in the direction of the arrows.

The central part of the valve comprises a core 11 which has a metal plug 12 molded therein, this plug having a socket 13 to which is attached a flushing rod or other device used to manipulate the valve. Depending from the core, there is a skirt portion 14 having an internal hollow part 15. The skirt and the wall of the core form a frustum of a cone.

The top wall 16 extends outwardly from the base of the skirt and is inclined downwardly and upwardly, forming in effect a frustum of a cone much flatter than that formed by the core 11 and the skirt 14. On the upper surface of this wall there are preferably a series of ribs 17, which taper outwardly from the base 19 adjacent the lower part of the skirt to the outer periphery 20 of such top wall. The top wall 16 also is thicker at the central part 21 than at the outer edge 22.

Extending downwardly from the outer edge of the top wall there is an inclined wall 23 forming the seating part of the valve. This wall forms a frustum of a cone and is inverted relative to the frustum of a cone formed by the top wall 16, and is not nearly so flat as the top wall. It is preferable also to have this wall of substantially uniform thickness from the upper portion 24 to the lower portion 25. Extending inwardly from this wall there is a flange 26 having a central opening 27.

Depending from the top wall 16 there is an annular partition 28 which forms in effect a frustum of a cone. This wall is, however, slightly thicker at the upper part 29 than at the lower part 30, and is provided with ribs 31 extending in a vertical direction relative to the wall, these ribs preventing the partition 29 from sticking to the end surface of the top wall or to the inner surface of the downwardly inclined wall 23, should these contact. There are also one or more notches 32 in the lower edge of the partition to break a vacuum, should such be formed. The lower edge 33 of the partition 28 is designed to be substantially parallel to the inner surface of the downwardly inclined lower wall 23.

Secured internally of the lower inclined wall 23 there is a ridge or rim 34 which has its upper surface 35 substantially parallel and in alignment with the inside surface of the wall 28, when the valve is in the normal inoperative position, as shown in Fig. 2. The outer wall 36 is somewhat inclined so that the base 37 of this rim is thicker than the inner edge 38. I preferably make the valve so that the core, the skirt 14, the top wall 16, the downwardly inclined wall 23 with the flange 26 and the rim 34, and also the partition 28 are of integral construction and may be of a good grade of flexible rubber.

The outlet for the tank or the like in which the valve is installed is indicated generally by the numeral 39 and has an inwardly beveled seat 40, this seat having a lower edge 41 and an upper edge 42.

The manner of action and functioning of my valve is substantially as follows:

As above mentioned, Fig. 2 illustrates the valve loosely resting on the valve seat in the position it would occupy when the tank is empty and the flushing valve had been lowered on the seat. As soon as the tank fills with liquid, the pressure of the liquid on the top wall 16 depresses this at the center, and as the core and the depending skirt are comparatively rigid, and moreover, as the ribs act as thrust elements, this upper wall 16 acts as a continuous toggle and forces or slightly stretches the outer downwardly inclined wall 23 so that it has an upper bend, as indicated by the numeral 43 in Fig. 3; thus bending such wall over the upper edge 42 of the seat, giving a tight seal at this point.

The downward movement of the upper wall 16 carries the partition 28 with it so that the lower edge of the partition fits behind the rim or ridge 34, the lower edge 33 bearing against the inside surface of the downwardly and inwardly inclined wall 23, as shown in Fig. 3. This internal partition then acts as a thrusting element under compression and distorts the wall 23 giving it an angular bend, as indicated by the numeral 44 in Fig. 3, thus pulling and stretching slightly this wall over the lower edge 41 of the valve seat. In this manner the wall 23 has a sealing bearing on the flat portion 40 of the valve seat and also on the edges 41 and 42, thus giving a three-element seal.

Should there be a tendency for a vacuum to be formed in the annular triangular-shaped chamber 45 between the outer part of the upper wall 16, the upper part of the wall 23 and the partition 28, this is readily broken by the notches 32 allowing free passage of air. Also, the ribs 31 prevent the partition 28 from sticking to the under surface of the upper wall 16, or to the inner surface of the downwardly inclined wall 23. The rim 26 functions to prevent undue spreading of the lower part of the wall 23 and, on account of the stiffness of the rim 34, holds this part sufficiently stiff when the valve is bearing against the valve seat. As air is trapped in the valve when it is pulled upwardly, it readily floats on the surface of the liquid until this liquid is drained out of the tank when it is forcibly drawn downwardly against the seat, forming a closure.

A feature of my invention is that the top wall 16 inclines upwardly and inwardly from the outer periphery of the valve where such top wall joins the downwardly and inwardly inclined wall 23. The skirt portion 14 extends upwardly at quite a steep angle from the inner portion of the top wall 16, and at the top there is the core 11 with the plug 12 secured therein for connecting to the flushing rod or stem or the like. This construction leaves an internal hollow part 15 inside of the skirt. The top wall 16, the inclined wall 23, the skirt 14, and the core 11 are all made of the same quality of flexible, resilient rubber. The top wall is quite stiff and at the connecting portion with the skirt is substantially as thick as the skirt and, in addition, the top wall has stiffening ribs 17 which abut at their inner portions against the lower part of the skirt 14. When the top wall is depressed until the partition 28 engages with the ridge or rim 24 on the inclined wall 23, the top wall develops a certain amount of rigidity, especially as the ribs 17 function as stiffening devices in regard to the flexing of the top wall 16, which wall tends to depress from the outer edge 22 as illustrated in Fig. 3. Another characteristic feature of my invention is that when the top wall is depressed through the pressure of water and as it approaches the horizontal position it slightly increases the diameter of the outer periphery of the junction of the downwardly inclined wall 23 and the top wall 16 and therefore slightly stretches this downwardly inclined wall, forming a tight seal with the upper edge of the valve seat.

It is to be understood that the particular shape and manner of connection of the various walls forming my valve may be changed for different sized outlets, and that while I use flexible rubber, it is to be understood that the material may be changed. Moreover, I have not disclosed in this application the moulds or the manufacture of these valves as these do not form part of the invention as it relates to the valve per se.

Various changes may be made in the principles of my invention without departing from the spirit thereof, as set forth in the description, drawings and claims.

I claim:

1. A flushing valve comprising a hollow structure having a downwardly and inwardly inclined wall resembling an inverted frustum of a cone, said wall being adapted to engage a valve seat, a top wall connected to the outer periphery of the inclined wall and extending upwardly and inwardly on a slight inclination, ribs connected to the top wall, a core connected to the top wall and the ribs having means to attach a flushing mechanism, a partition depending from the top wall terminating short of the inclined wall, the lower edge of said partition engaging the inclined wall on downward distortion of the top wall, due to pressure thereon, said distortion forcing the inclined wall into close contact with part of a valve seat and the said partition forcing the lower end of the inclined wall into contact with another part of the valve seat.

2. A flushing valve, as claimed in claim 1, the partition having notches to prevent the formation of a vacuum in a hollow valve.

3. A flushing valve, as claimed in claim 1, a rim attached to the inclined wall internally thereof, said rim being positioned to engage the lower edge of the said partition.

4. A flushing valve having a downwardly and inwardly inclined wall forming a frustum of a cone inverted, a top wall connected to the outer periphery thereof, extending upwardly and inwardly on an inclination, a core having a skirt connected to the top wall, means in the core to attach a flushing mechanism, a flange extending inwardly from the lower edge of the inclined wall and having an opening therein, the said top wall being distortable on downward pressure and being adapted to bend the upper part of the inclined wall over a valve seat, the said valve being hollow inside the skirt, the inclined wall and the flange.

5. A flushing valve, as claimed in claim 4, means internally of the valve interengaging the top wall and the inclined wall to distort the lower part of said inclined wall on downward distortion of the top wall, bending the lower part of the inclined wall into engagement with part of the valve seat.

6. A flushing valve, as claimed in claim 4, an annular partition depending from the top wall at an outward and downward inclination therefrom, said partition terminating short of the inclined wall, and means on the inclined wall internally thereof to engage the lower part of the partition, said partition distorting the lower part of the inclined wall on downward distortion of the top wall.

7. The combination of a hollow flushing valve having a downwardly and inwardly inclined wall, an upper wall connected thereto, a valve seat having a surface engaging the said inclined wall, the top wall and inclined wall allowing relative movement whereby on application of liquid pressure to the top wall, the inclined wall is distorted and bent over an edge of the valve seat, and means extending from the upper wall engaging the inclined wall below the valve seat and distorting said wall to bend same against a lower angle of the valve seat.

8. A flushing valve having an inwardly and downwardly inclined wall adapted to engage a valve seat, a top wall connected to the outer periphery of the inclined wall, said top wall having an upward inclination, means to connect the top wall to a flushing mechanism, said top wall being depressible under liquid pressure and stretching and distorting the inclined wall to force same into close contact with part of the valve seat, a partition depending from the top wall, the lower end of the partition operating against the lower part of the inclined wall and distorting said wall, pressing part of same tightly against the valve seat.

9. A flushing valve having an inwardly and downwardly inclined wall adapted to engage a valve seat, a top wall connected to the outer periphery of the inclined wall, said top wall having an upward inclination, means to connect the top wall to a flushing mechanism, said top wall being depressible under liquid pressure, stretching and distorting the inclined wall to force same into close contact with part of the valve seat, a rim formed internally on the inclined wall, a partition depending from the top wall and terminating short of the inclined wall, said partition engaging behind the said rim on the downward movement of the top wall and distorting the inclined wall into close contact with part of the valve seat.

10. A flushing valve having a downwardly and inwardly inclined wall adapted to engage a valve seat, an upwardly and inwardly inclined wall connected to the seat engaging wall at their outer periphery, the said top wall being adapted to deflect by water pressure on top thereof and stretch and distort the upper portion of the seat engaging wall, means extending from the upper wall engaging the inclined wall below the position of the valve seat and being adapted to bend the lower portion of said wall outwardly against the lower portion of the valve seat.

11. In a flushing valve having a downwardly and inwardly inclined wall to engage a valve seat, a top wall connected thereto at a peripheral edge, a structure depending from the top wall, adapted to engage the portion of the inclined wall below the valve seat and on depression of the top wall to distort the lower part of the inclined wall.

12. In a flushing valve having a downwardly and inwardly inclined wall to engage a valve seat, a top wall connected thereto, a partition-like structure depending downwardly from the top wall and adapted to engage the inclined wall below the valve seat, thereby distorting such inclined wall against the seat on the depression of the top wall.

13. In a flushing valve having a downwardly and inwardly inclined wall of flexible material to engage a valve seat, a top wall connected thereto, a rim attached to the inside of the inclined wall below the valve seat and a downwardly extending structure from the top wall adapted to engage the said rim and the inclined wall below the valve seat and distort the inclined wall on the distortion downwardly of the top wall.

14. In a flushing valve having a downwardly and inwardly inclined flexible wall to engage a valve seat, a top wall connected thereto at a peripheral portion, the inclined wall having an annular rim on the inside below the valve seat, an annular partition extending downwardly from the top wall and adapted on downward distortion of the top wall to engage the said rim and the portion of the inclined wall below the valve seat and distort the inclined wall outwardly.

15. A flushing valve having a downwardly and inwardly inclined wall to engage the valve seat, a top wall upwardly and inwardly inclined connected thereto at the outer peripheral edge of the valve, a core having means to secure a valve stem thereto, a relatively long skirt connecting between the core and the top wall and being at a steeper slope than the slope of the top wall, the top wall at its junction point with the skirt being stiffer than the skirt, the said core, the skirt, the top wall, and the inclined wall being formed of the same quality of flexible, resilient rubber.

16. A flushing valve having a downwardly and inwardly inclined wall to engage a valve seat, a top wall upwardly and inwardly inclined connected thereto at the peripheral edge, a core with means to secure a valve steam thereto, a relatively long skirt connecting the core and the top wall, said skirt having a steeper slope than that of the top wall and there being a hollow space inside of the skirt, the top wall having strengthening ribs engaging the lower part of the skirt and giving the inner portion of the top wall greater stiffness than the said skirt, the said core, the skirt, the top wall, ribs, and inclined wall being of the same quality of flexible, resilient rubber.

17. A flushing valve as claimed in claim 16, a thrust transmitting structure interconnecting the top wall and the inclined wall when the top wall is depressed, said structure engaging the top wall adjacent the connection of the skirt thereto.

In testimony whereof I have signed my name to this specification.

JACK E. WALKER.